United States Patent [19]

Sakabe et al.

[11] Patent Number: 5,056,427

[45] Date of Patent: Oct. 15, 1991

[54] SEALING OF CAVITY ON REAGENT TRAY

[75] Inventors: Munechika Sakabe; Osamu Segawa, both of Tokyo, Japan

[73] Assignee: Seiko Instruments Inc., Japan

[21] Appl. No.: 493,520

[22] Filed: Mar. 14, 1990

[30] Foreign Application Priority Data

Mar. 15, 1989 [JP] Japan ..................... 1-63166
Mar. 15, 1989 [JP] Japan ..................... 1-63169
Mar. 15, 1989 [JP] Japan ..................... 1-63170

[51] Int. Cl.$^5$ ............................... B30B 5/02
[52] U.S. Cl. ................... 100/211; 100/225; 100/295; 156/145; 156/290; 156/581; 156/583.3; 53/127; 53/329
[58] Field of Search ............... 53/127, 287, 329, 373, 53/440, 478, 485, 509, 526; 100/211, 221, 225, 295; 156/145, 146, 290, 292, 293, 323, 581, 583.3; 269/43, 270

[56] References Cited

U.S. PATENT DOCUMENTS

| | | | |
|---|---|---|---|
| 2,356,225 | 8/1944 | Cunnington | 100/211 X |
| 2,519,661 | 8/1950 | Johnson | 100/295 X |
| 2,691,935 | 10/1954 | Zeiler et al. | 100/211 X |
| 4,156,589 | 5/1979 | Schmitt et al. | 100/211 X |
| 4,734,155 | 5/1988 | Tsunoda et al. | 100/211 X |
| 4,826,593 | 5/1989 | Nev | 100/211 X |

Primary Examiner—Robert L. Spruill
Assistant Examiner—Daniel B. Moon
Attorney, Agent, or Firm—Bruce L. Adams; Van C. Wilks

[57] ABSTRACT

A thermal reaction apparatus for sealing liquid within cavities includes a tray having cavities for storing therein liquid. The cavities have openings arranged at varying levels in thickness direction of the tray. A planar sealing member is disposed on the tray to cover the openings and is comprised of a pair of flexible sheets and viscous fluid filled between the flexible sheets. A pressure plate is disposed on the planar sealing member for applying thereto pressure effective to locally flow the viscous fluid to enable the sealing member to seal the varying levels of the cavity openings to thereby prevent evaporation of the liquid stored in the cavities. Alternatively, the elastic sealing member is comprised of an elastic sheet and projections arranged in registration with the respective cavities, and the pressure plate is disposed in contact with the projections for applying there to pressure effective to deform locally the sealing member through the projections to enable the sealing member to fittably seal the cavity openings. Or, the pressure plate may have projections, instead of the sealing member, in contact with the planar sealing member in registration to the respective cavities.

2 Claims, 3 Drawing Sheets

SEALING OF CAVITY ON REAGENT TRAY

BACKGROUND OF THE INVENTION

The present invention relates to a sealing structure of cavities containing solutions on a reagent tray for suppressing evaporation of the solutions during thermal reaction.

FIG. 7 shows the conventional sealing structure of the reagent tray. A tray 70 has a plurality of cavities 71 which contain solution 72. The cavities 71 have openings along a face of the tray 70 at varying levels. A flat sealing member 73 is disposed on the tray 70 to cover the cavity openings. The flat sealing member 73 is composed of an elastic sheet. A presure plate 74 is disposed on the sealing member 73 to apply pressure to the sealing member 73 to seal the cavity opening. The set of tray 71, sealing member 73 and pressure plate 74 is heated by a pair of heaters 75 and 76 to effect thermal reaction of the solution 72 within each cavity 71.

However, the sealing member 73 cannot tightly seal all of the cavities 71 due to the varying levels of the cavity openings. Thus, some of the solution may evaporate during the thermal reaction to thereby hinder the uniform reaction throughout the cavities.

SUMMARY OF THE INVENTION

An object of the present invention is to, therefore, provide a tight sealing structure of tray cavities in a thermal reaction apparatus to prevent evaporation of solutions contained in individual cavities which have varying levels of openings.

According to a first aspect of the invention, the thermal reaction apparatus is comprised of a tray having cavities for storing therein liquid, the cavities having openings arranged at varying levels in the thickness direction of the tray; a planar sealing member disposed on the tray to cover the openings, and comprised of a pair of flexible sheets and viscous fluid filled between the flexible sheets; and a pressure plate disposed on the planar sealing member for applying thereto pressure effective to locally flow the viscous fluid to enable the sealing member to seal the varying levels of the cavity openings to thereby prevent evaporation of the liquid stored in the cavities.

According to a second aspect of the invention, the thermal reaction apparatus is comprised of a tray having cavities for storing therein liquids, the cavities having, openigs arranged at varying levels in the thickness direction of the tray; an elastic sealing member disposed on the tray to cover the openings, and having thereon projections arranged in registration with the respective cavities; and a pressure plate disposed on the sealing member in contact with the projections for applying thereto pressure effective to deform locally the sealing member through the projections to enable the sealing member to fittably seal the varying levels of the cavity openigs to thereby prevent evaporation of the liquid stored in the cavities.

According to a third aspect of the invention, the thermal reaction apparatus is comprised of a tray having cavities for storing therein liquid, the cavities having openings arranged at varying levels in the thickness direction of the tray; a planar sealing member composed of elastic material and disposed on the tray to cover the openings; and a pressure plate disposed on the planar sealing member and having projections in contact with the planar sealing member in registration with the respective cavities for applying to the sealing member pressure effective to deform locally the elastic sealing member through the projections to enable the sealing member to fittably seal the varying levels of the cavity openings to thereby prevent evaporation of the liquid stored in the cavities.

DETAILED DESCRIPTION OF EMBODIMENTS

Figure 1:
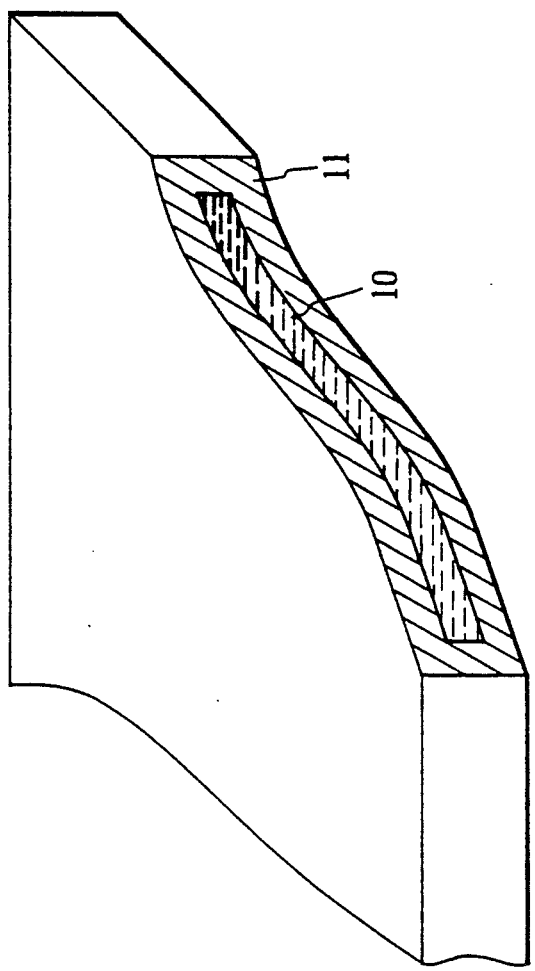
FIG. 1 is a partly broken view of a sealing member according to the present invention.

FIG. 1 is a partly broken view of an evaporation-preventing sealing member according to the present invention. Silicone oil 10 is sealed within a double layer structure of an elastic sheet 11 such that the silicon oil 10 can flow freely in response to external pressure applied to the elastic sheet 11.

Figure 2:
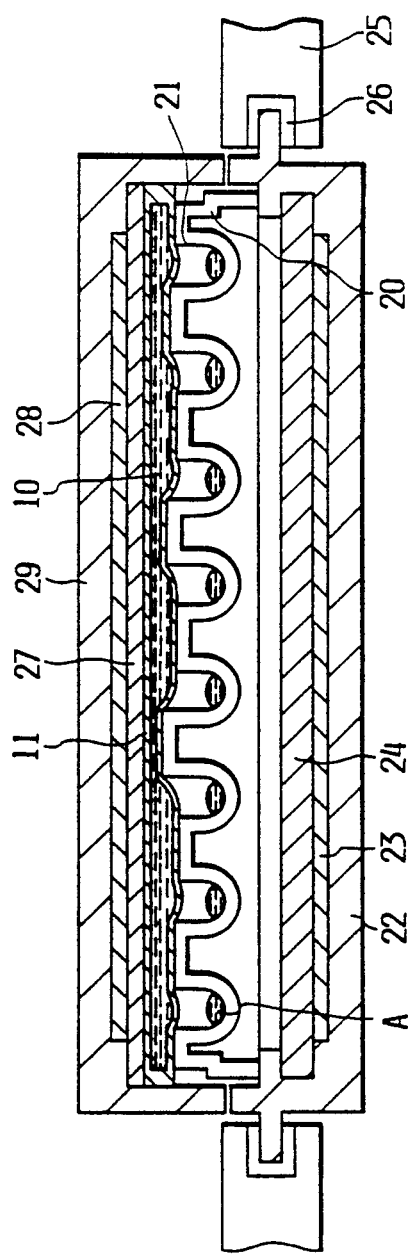
FIG. 2 is a sectional view showing a first embodiment of the present invention utilizing the FIG. 1 sealing member.

FIG. 2 is a sectional view of a first embodiment of the thermal reaction apparatus applied with the FIG. 1 sealing member. A tray 20 is provided in its surface portion with a plurality of cavities 21 having openings of different levels, and is supported on a lower base 22. A lower heater 23 and a lower thermo-conductive plate 24 are superposed on the lower base 22. The lower base 22 is held by a holder 25 through a thermally insulating member 26. The elastic sheet 11 filled with the silicone oil 10, an upper thermo-conductive plate 27 and an upper heater 28 are sequentially superposed within a pressure plate or an upper base 29 such that the elastic sheet 11 is made in contact with the tray 20 in which the cavities 21 store solution A.

In such construction, a given pressure is applied to the upper base 29 so that the silicone oil 10 is displaced within the elastic sheet 11 to adjust to the different levels of the openings of the cavities 21 on the tray 20 to thereby apply uniform distribution of the pressure to the upper face of the tray 20. Next, the lower heater 23 and the upper heater 28 are operated to effect reaction of the solution A in the cavities 21 without evaporation of the solution A.

As described above, according to the first aspect of the present invention, the elastic sheet can effect sealing without regard to the difference of the cavity opening levels on the tray, thereby providing the effect that the evaporation of the liquid within the cavities of the tray can be prevented.

Figure 3:
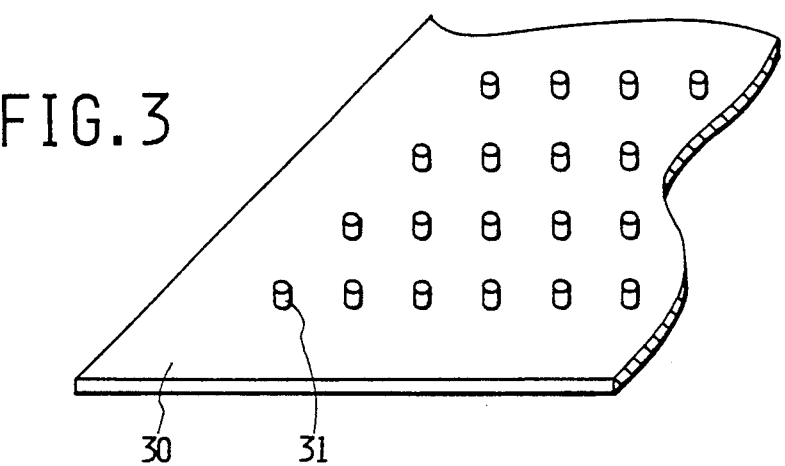
FIG. 3 is a partial perspective view of another sealing member according to the present invention.
Figure 4:
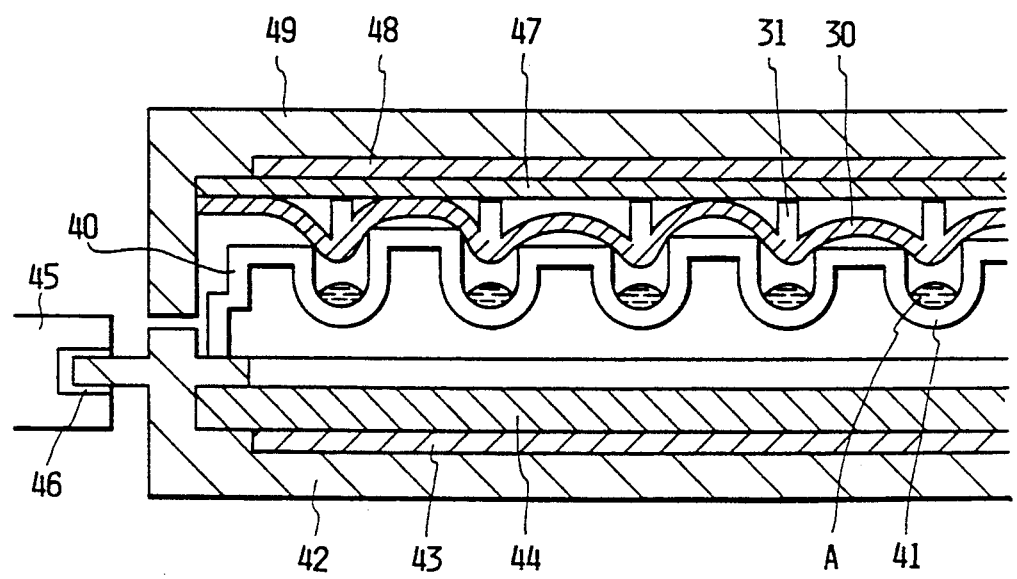
FIG. 4 is a sectional view showing a second embodiment of the present invention utilizing the FIG. 3 sealing member.

FIG. 3 shows another type of sealing member which is composed of an elastic sheet 30 provided thereon with a plurality of upstanding projections 31. FIG. 4 shows a second embodiment of the thermal reaction apparatus utilizing the FIG. 3 sealing member.

A tray 40 has a plurality of cavities 41 having different levels of openings, and is held on a lower base 42. A lower heater 42 and a lower heat-distributing plate 44 are superposed with each other within the lower base 42. The lower base 42 is held by a holder 45 through a thermally insulating member 46. The elastic sheet 30 having on its upper face the upstanding projections 31, an upper heat-distributing plate 47 and an upper heater 48 are sequentially superposed on an upper base 49. The projections 31 are arranged in registration with the center of the corresponding cavities 41. In such a construction, appropriate pressure is applied to the upper base 49 or pressure plate such that each of the projections 31 effect the local deformation of the elastic sheet 30 along the opening level of the corresponding cavity 41 so that the solution a stored in the cavities 41 is thermally reacted without evaporation.

Figure 5:
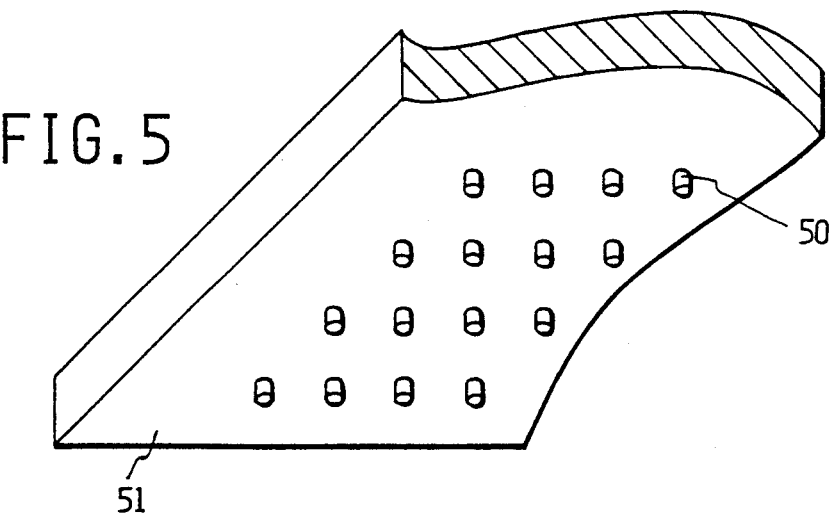
FIG. 5 is a partial perspective view of a pressure plate used in the present invention.
Figure 6:
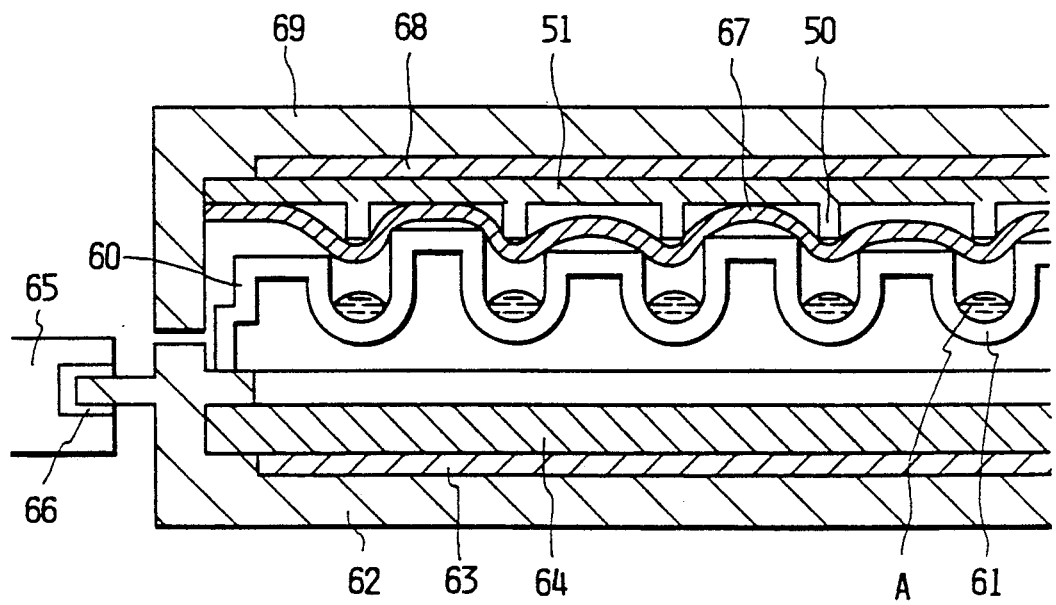
FIG. 6 is a sectional view showing a third embodiment of the present invention utilizing the FIG. 5 pressure plate.
Figure 7:
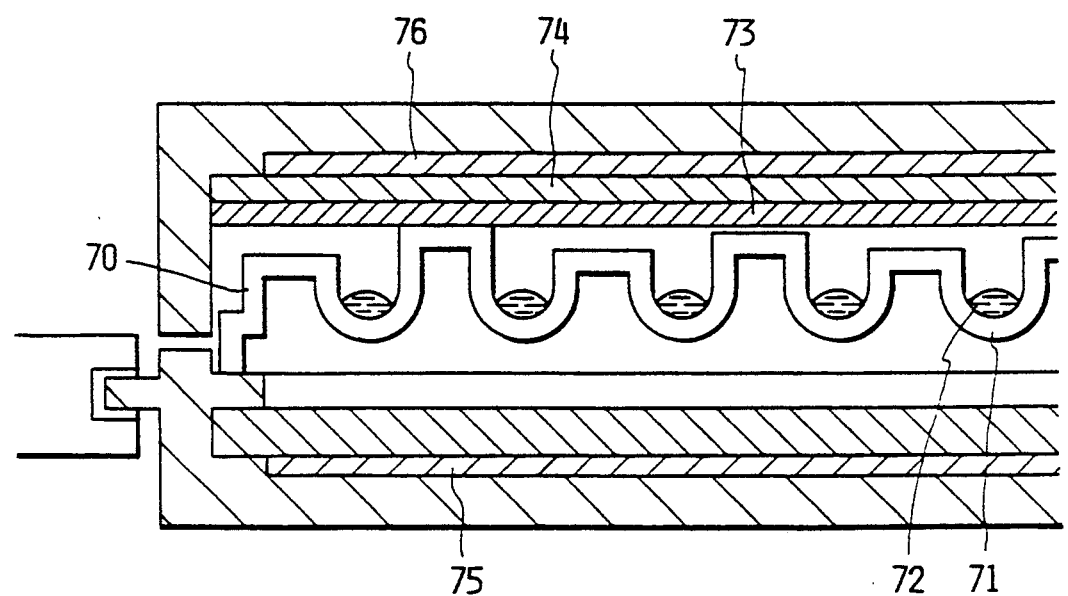
FIG. 7 shows the conventional thermal reaction apparatus.

FIG. 5 is a perspective view showin an evaporation-preventing pressure plate 51. Projections 50 are attached to and depend from a lower face of the pressure plate 51. FIG. 6 is a sectional view of a third embodiment of the thermal reaction apparatus utilizing the FIG. 5 pressure plate. A tray 60 has a plurality of cavities 61 which have different levels or heights of openings, and is held in a lower base 62. A lower heater 63 and a lower heat-distributing plate 64 are superposed within the lower base 62. The lower base 62 is held by a holder 65 through a thermally insulating member 66. An elastic sheet 67, the inventive pressure plate 51 and an upper heater 68 are sequentially superposed on the tray 60 within the upper base 69. The pressure plate 51 serves also as a heat-distributing plate, and is disposed such that the projections 50 are placed in contact with the elastic sheet 67 or sealing member. The projections 50 are positioned in registration with centers of the respective cavities 61 of the tray 60. In such a construction, by applying appropriate pressure to the upper base 69, the projections 50 deform locally the elastic sheet 67 in a concave shape along the levels of the openings of the cavities 61 to prevent evaporation of solution A stored in the cavities 61 while conducting thermal reaction.

As described above, according to the third aspect of the present invention, the elastic sheet can be fitted without regard to the level difference of the cavity openings, hence the evaporation of solution within the plural cavities of the tray can be effectively prevented.

What is claimed is:

1. An apparatus for sealing liquid within cavities, comprising:
   a tray having cavities for storing therein liquid; the cavities having openings arranged at varying levels in the thickness direction of the tray;
   an elastic sealing member disposed on the tray to cover the openings, the sealing member having thereon projections arranged in registration with the respective cavities; and
   a pressure plate disposed on the sealing member in contact with the projections for applying thereto pressure effective to deform locally the sealing member through the projections to enable the sealing member to fittably seal the varying levels of the cavity openings the thereby prevent evaporation of the liquid stored in the cavities.

2. An apparatus for sealing liquid cavities, comprising:
   a tray having cavities for storing therein liquid, the cavities having openings arranged at varying levels in the thickness direction of the tray;
   a planar sealing member composed of elastic material and disposed on the tray to cover the openings; and
   a pressure plate disposed on the planar sealing member and having projections in contact with the planar sealing member in registration with the respective cavities for applying to the sealing member pressure effective to deform locally the elastic sealing member through the projections to enable the sealing member to fittably seal the varying levels of the cavity openings to thereby prevent evaporation of the liquid stored in the cavities.

* * * * *